United States Patent Office 3,390,182
Patented June 25, 1968

---

3,390,182
METHOD FOR PREPARING AMINE N OXIDES
John Kollar, Wallington, N.J., and Robert S. Barker, Port Washington, N.Y., assignors to Halcon International, Inc., a corporation of Delaware
No Drawing. Filed Dec. 16, 1964, Ser. No. 418,874
5 Claims. (Cl. 260—583)

ABSTRACT OF THE DISCLOSURE

A method for preparing amine N oxides by the reaction of tertiary amines with organic hydroperoxides in the liquid phase and in the presence of a catalyst.

---

This invention is directed to the production of amine N oxides. More particularly, this invention is concerned with a method for preparing amine N oxides involving the catalytic reaction of tertiary amines and organic hydroperoxides.

Amine oxides are achieving increased use in various shampoo, soap and other formulations. Although various methods are known for the preparation of these materials, these prior methods have not been satisfactory from the standpoint of economy and ease of preparation. A considerable amount of time and effort has gone into research toward improved methods for making these compounds.

It is an object of this invention to provide an improved method for the production of amine N oxides.

It is a particular object of the invention to provide a process for the production of amine N oxides involving the catalytic reaction of tertiary amines with organic hydroperoxides.

Other objects will be apparent from the following description of the invention.

In accordance with the present invention, it has now been found that amine N oxides can conveniently be prepared in high yields through the liquid phase catalyzed reaction of tertiary amines and organic hydroperoxides. Among the advantages achieved through the present discovery are improved reaction selectivities and yields of product as well as a significantly improved ease of separation of the desired product.

In accordance with the invention, tertiary amines are reacted in the liquid phase with an organic hydroperoxide. Suitable tertiary amines which are employed in this process include amines having the formula:

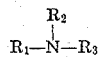

wherein each of $R_1$, $R_2$, $R_3$ is an alkyl, aryl, alkaryl or aralkyl group having 1 to about 20 carbon atoms. Illustrative groups include methyl, ethyl propyl, butyl, decyl, isopentyl, phenyl, xylyl, tolyl, cumyl, and the like. Additionally, the tertiary amines include pyridine and other similar cyclic compounds. Specific illustrative tertiary amines which can be employed in this process are trimethylamine, triethylamine, octadecyldimethylamine, dimethyl naphthyl amine, N,N-diethyl aniline, dimethylphenylamine, pyridine and the like.

The hydroperoxides which are employed in the invention are those having the formula ROOH wherein R is a substituted or unsubstituted alkyl, cycloalkyl or aralkyl radical having about 3 to 20 carbon atoms. R may be a heterocyclic or like radical.

Illustrative and preferred hydroperoxides are cumene hydroperoxide, ethylbenzene hydroperoxide, tertiary butyl hydroperoxide, cyclohexanone peroxide, tetralin hydroperoxide, methyl ethyl ketone peroxide, methylcyclohexane hydroperoxide, and the like.

The catalysts include compounds of the following:
Ti, V, Cr, Se, Zr, Nb, Mo, Te, Ta, W, Re, U. These may be characterized as forming peracids or as hydroxylation catalysts. By far, the preferred catalysts are compounds of V, W, Mo, Ti, Re, Se, Nb, Te and Ta.

The amount of metal in solution used as catalyst in the process can be varied widely, although as a rule it is desirable to use at least 0.00001 mol and preferably 0.002 to 0.03 mol per mol of hydroperoxide present. Amounts greater than about 0.1 mol seem to give no advantage over smaller amounts, although amounts up to 1 mol or more per mol of hydroperoxide can be employed. The catalysts remain dissolved in the reaction mixture throughout the process and can be reused in the reaction after removal of the reaction products therefrom. The molybdenum compounds include the molybdenum organic salts, the oxides such as $Mo_2O_3$, $MoO_2$, $MoO_3$, molybdic acid, the molybdenum chlorides and oxychlorides, molybdenum fluoride, phosphate, sulfide, and the like. Heteropolyacids containing molybdenum can be used as can salts thereof; examples include phosphomolybdic acid and the sodium and potassium salts thereof. Similar or analogous compounds of the other metals mentioned may be used, as may mixtures thereof.

The catalytic components may be employed in the oxidation reaction in the form of a compound or mixture which is initially soluble in the reaction medium. While solubility will, to some extent depend on the particular reaction medium employed, a suitably soluble substance contemplated by the invention would include hydrocarbon soluble, organo-metallic compounds having a solubility in methanol at room temperature of at least 0.1 gram per liter. Illustrative soluble forms of the catalytic materials are the naphthenates, stearates, octoates, carbonyls and the like. Various chelates, association compounds and enol salts, such, for example, as acetoacetonates may also be used. Specific and preferred catalytic compounds of this type for use in the invention are the naphthenates and carbonyls of molybdenum, vanadium, tungsten, titanium, rhenium, niobium, tantalum and selenium. Alkoxy compounds such as tetrabutyl titanate and other like alkyl titanates are very useful.

In the reaction, the ratio of tertiary amine to organic hydroperoxide can vary over a wide range. Generally, overall feed mol ratios of amine to hydroperoxide broadly in the range of 0.2:1 to 100:1, desirably 1:1 to 20:1 and preferably 2:1 to 10:1 are employed.

The concentration of hydroperoxides in the substrate oxidation reaction mixture at the beginning of the reaction will normally be one percent or more although lesser concentrations will be effective and can be used.

The reaction can be carried out in the presence of a solvent, and in fact, it is generally desirable that one be used. In general, aqueous solvents are not desired. Among the suitable substances are hydrocarbons, which may be aliphatic, naphthenic or aromatic, and the oxygenated derivatives of these hydrocarbons. Preferably, the solvent has the same carbon skeleton as the hydroperoxide used, so as to minimize or avoid solvent separation problems. Particularly preferred solvents are tertiary alkanols including tertiary butanol, phenyl dimethyl carbonol, and the like.

Temperatures which are employed for this reaction can vary quite widely. Temperatures broadly in the range of about −20 to about 200° C., desirably 0 to 150° C., and preferably 50 to 120 C. are employed. The reaction is carried out at pressure conditions, sufficient to maintain a liquid reaction mixture. Although sub-atmospheric pressures can be employed, pressures usually in the range of about atmospheric to about 1000 p.s.i.g. are most desirable.

The following examples will serve to illustrate practice of the invention.

Example 1

To about 11.4 grams of dimethyl octadecyl amine was added 23.6 grams of an oxidate obtained by the molecular oxygen oxidation of cumene and containing 43% cumene hydroperoxide. To the resulting mixture, there was added 0.1 gram of molybdenum napththenate containing 5% by weight of molybdenum.

The resulting mixture was heated to 90° C. and held at that temperature for 2 hours. The product mixture was cooled to about room temperature and crystallized product dimethyl octadecyl amine N oxide was recovered by filtration. The product yield was 64% based on converted cumene hydroperoxide. Additional product remained in solution and could be recovered by cooling to very low temperatures or by other techniques.

Example 2

Example 1 was repeated except that in addition to the molybdenum napththenate catalyst, there was also added an equimolar amount of sodium naphthenate based on the molybdenum naphthenate.

The yield of dimethyl octadecyl amine N oxide was 57.7% based on hydroperoxide.

Example 3

Example 1 was repeated except that 0.1 gram of vanadium naphthenate containing 3.4% by weight vanadium was employed in place of the molybdenum naphthenate.

The yield of dimethyl octadecyl amine N oxide product was 51.2% based on hydroperoxide.

Example 4

Example 1 was repeated except that 0.01 gram of tungsten trioxide was employed in place of the molybdenum naphthenate catalyst.

The yield of dimethyl octadecyl amine N oxide product was 52.4% based on hydroperoxide.

Comparative Example A

In a comparative run, Example 1 was repeated except that no molybdenum naphthenate catalyst was employed.

The yield of dimethyl octadecyl amine N oxide was only 12.6% based on hydroperoxide.

Example 5

To about 12.1 grams of N,N-dimethyl aniline were added about 50 grams of oxidate resulting from the molecular oxygen oxidation of ethyl benzene and containing 27.1% of ethyl benzene hydroperoxide. About 0.2 gram of molybdenum naphthenate containing 5% by weight molybdenum were added to the mixture and the resulting mixture was heated to 80° C. and maintained at this temperature for 2 hours.

The reaction mixture was cooled to about room temperature, and crystallized N,N-dimethyl aniline N oxide was separated by filtration. The product yield was 76.4% based on hydroperoxide. Additional product remained in solution; such additional product could be recovered by supplemental treating steps.

Comparative Example B

Example 5 was repeated with the exception that no catalyst was employed. The product yield of N,N-dimethyl aniline N oxide was only 17.2% based on hydroperoxide.

The above examples clearly illustrate the important advantages which are achieved as a result of practice of this invention.

Example 6

Example 1 is repeated using an equimolar amount of tetrabutyl titanium in place of the molybdenum naphthenate. Similar results are obtained.

Example 7

Example 1 is repeated using an equimolar amount of tantalum naphthenate in place of the molybdenum naphthenate. Similar results are obtained.

Example 8

Example 1 is repeated using an equimolar amount of rhenium heptoxide in place of the molybdenum naphthenate. Similar results are obtained.

Example 9

Example 1 is repeated using an equimolar amount of niobium naphthenate in place of the molybdenum naphthenate. Similar results are obtained.

Example 10

Example 1 is repeated using an equimolar amount of tellurium naphthenate in place of the molybdenum naphthenate. Similar results are obtained.

Example 11

Example 1 is repeated using an equimolar amount of selenium naphthenate in place of the molybdenum naphthenate. Similar results are obtained.

We claim:

1. The method for preparing an amine N oxide which comprises contacting in the liquid phase a tertiary amine having the formula

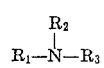

wherein $R_1$, $R_2$, and $R_3$ are alkyl, aryl, alkaryl or aralkyl groups having up to 20 carbon atoms with an organic hydroperoxide having the formula ROOH wherein R is alkyl, cycloalkyl, or aralkyl having up to 20 carbon atoms in the presence of a catalytic amount of compounds of Mo, W, V, Se, Ti, Ta, Re, Nb or Te at temperatures of about −20° C. to about 20° C. and at pressures sufficient to maintain a liquid reaction mixture, and separating product amine N oxide from the resulting mixture, said amine N oxide being formed by an equimolar reaction between the tertiary amine and the hydroperoxide.

2. The method of claim 1 wherein said tertiary amine is a trialkyl amine.

3. The method of claim 1 wherein said tertiary amine is trialkyl amine having one alkyl group of at least 12 carbon atoms.

4. The method of claim 3 wherein said trialkyl amine is dimethyl octadecyl amine.

5. The method of claim 1 wherein said organic hydroperoxide is cumene hydroperoxide.

References Cited

Y 109 IVb/12q 2–56 German printed application (Ishidate et al.).

CHARLES B. PARKER, *Primary Examiner.*

R. L. RAYMOND, *Assistant Examiner.*